United States Patent [19]

Dunkman et al.

[11] Patent Number: 5,197,191
[45] Date of Patent: Mar. 30, 1993

[54] REPAIR OF AIRFOIL EDGES

[75] Inventors: Dewey D. Dunkman, Cincinnati; Warren D. Grossklaus, Jr., Westchester; Petra Bracko, Norwood, all of Ohio

[73] Assignee: General Electric Company, Cincinnati, Ohio

[21] Appl. No.: 663,506

[22] Filed: Mar. 4, 1991

[51] Int. Cl.$^5$ ............... B21D 1/00; B21D 3/16; B23P 6/00
[52] U.S. Cl. ............................. 29/889.1; 29/402.19
[58] Field of Search ............ 29/889.1, 402.04, 402.05, 29/402.11, 402.12, 402.13, 402.19

[56] References Cited

U.S. PATENT DOCUMENTS

| | | | |
|---|---|---|---|
| 3,487,530 | 1/1970 | Ely | 29/402.13 X |
| 4,128,929 | 12/1978 | DeMusis | 29/889.1 |
| 4,161,056 | 7/1979 | Dunham | 29/402.09 |
| 4,550,497 | 11/1985 | Sharon | 30/169 |
| 4,589,175 | 5/1986 | Arrigoni | 29/889.1 |
| 4,608,756 | 9/1986 | Sharon | 30/287 |
| 4,639,991 | 2/1987 | Sharon | 29/156.8 |
| 4,842,663 | 6/1989 | Kramer | 29/402.11 X |
| 4,873,751 | 10/1989 | Walker et al. | 29/889.1 |
| 5,023,987 | 6/1991 | Wuepper et al. | 29/402.11 |
| 5,031,313 | 7/1991 | Blair et al. | 29/889.1 |

Primary Examiner—Timothy V. Eley
Attorney, Agent, or Firm—Jerome C. Squillaro; Carmen Santa Maria

[57] ABSTRACT

The present invention provides a method and apparatus to repair gouged out and damaged leading and trailing edges of gas turbine engine blades, particularly fan blades, by cutting away a curved section including the damaged area and forming a blend radius along the repaired edge. The apparatus includes a unique machine tool guide having an adjustable cutting depth guide and mountable to a hand held machine tool driver, such as 90 degree angle head air motor, that drives a rotary cutter.

4 Claims, 2 Drawing Sheets

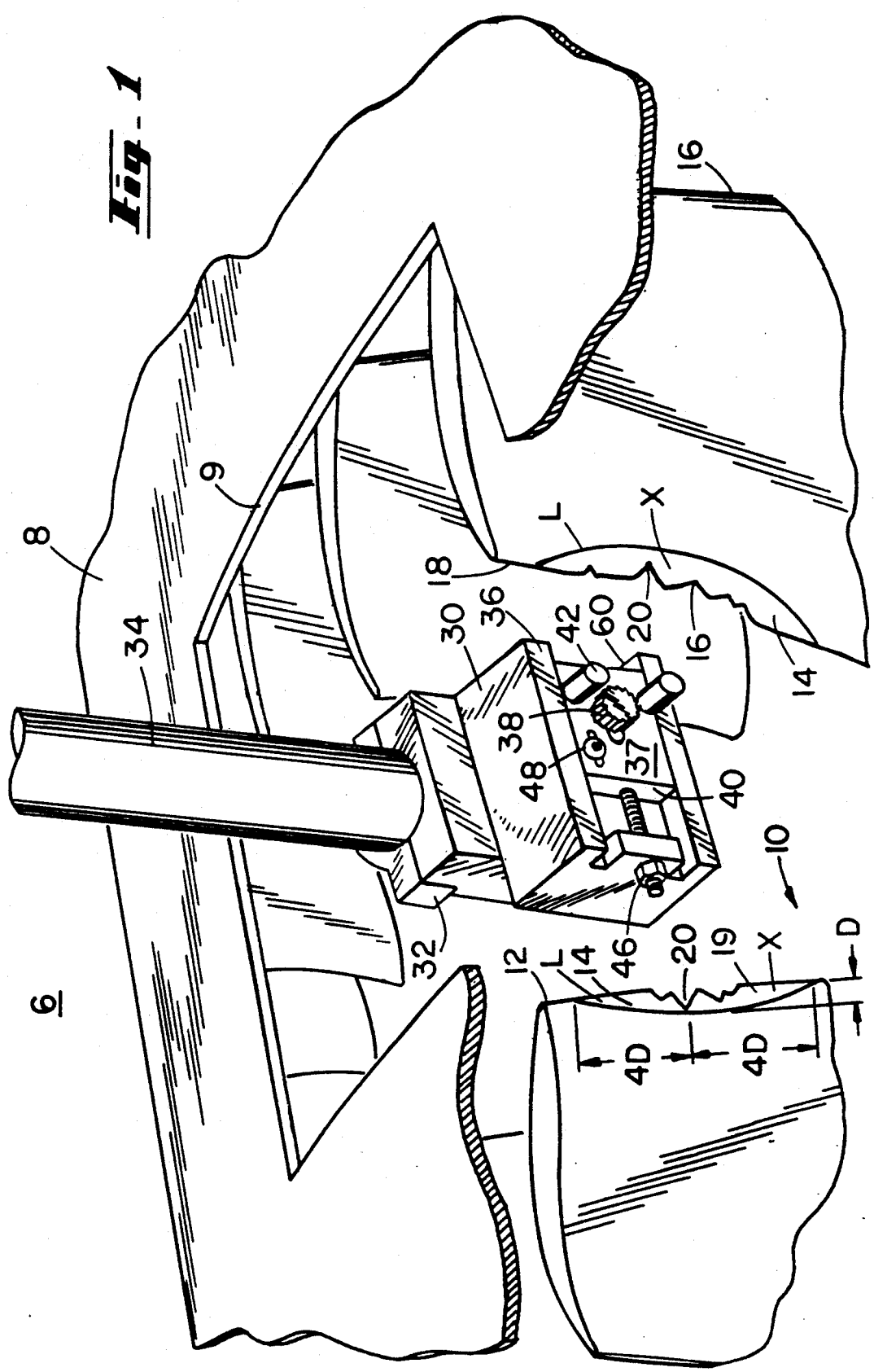

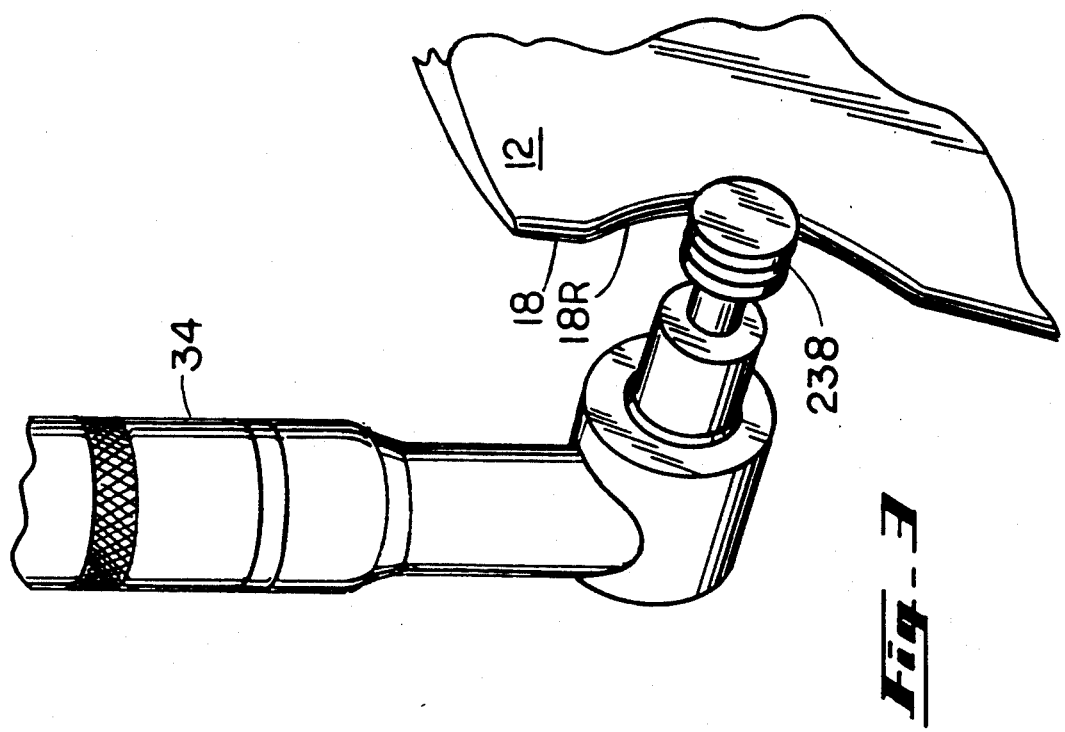
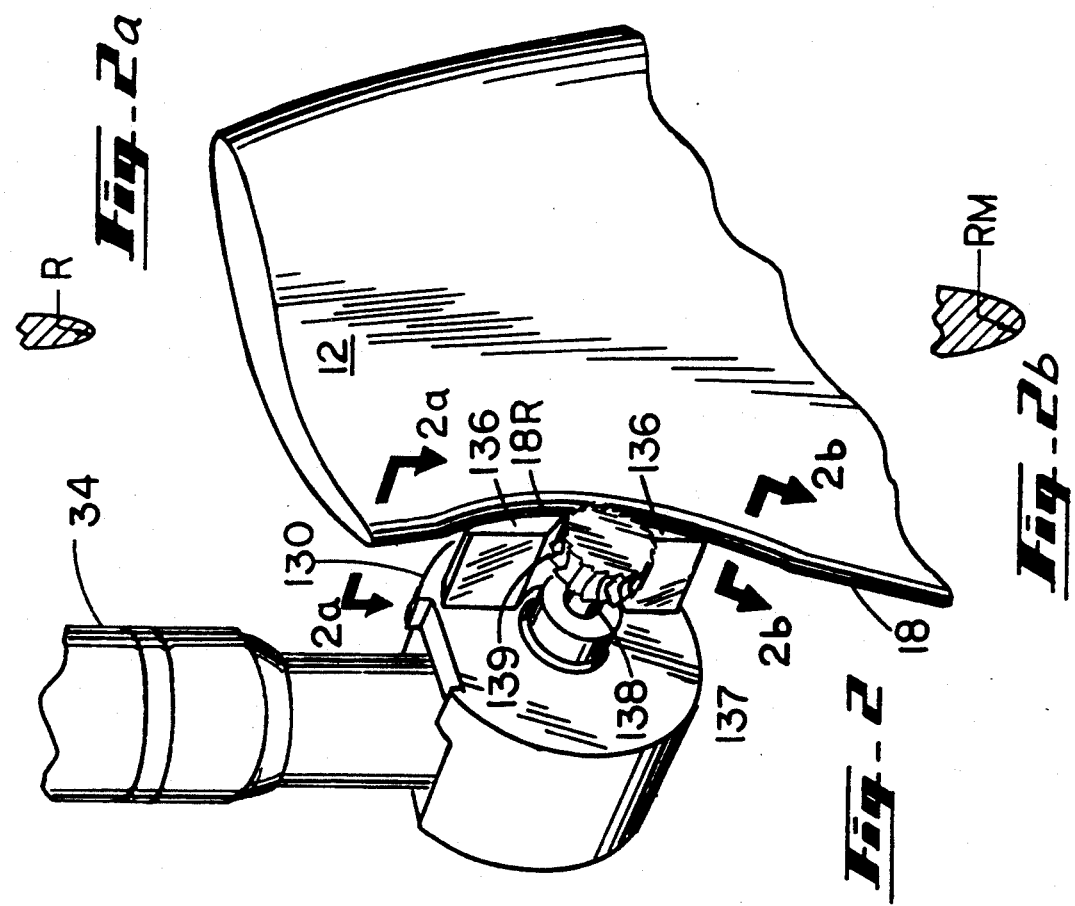

REPAIR OF AIRFOIL EDGES

BACKGROUND OF THE INVENTION

The Government has rights in this invention pursuant to Contract No. F33657-83-C-0281 awarded by the Department of the Air Force.

FIELD OF THE INVENTION

This invention relates to the repair of gas turbine engine airfoils without removing the airfoil from the engine, and more particularly to the repair of BLISK fan blades.

DESCRIPTION OF RELATED ART

Leading and trailing edges of aircraft gas turbine engine rotor blade airfoils are subject to wear and damage that forms gouges and requires repair with a minimum of cost and difficulty. Repair of the airfoils conventionally requires their removal. However in combat as well as under other extenuating circumstances there is a need to field repair damaged airfoils without removing the blade or the engine from the aircraft. With the advent of blade integral disks or BLISKs there is an even greater need to repair the leading and trailing edges of the blade airfoils in the field while the engine is installed on the aircraft, either on the wing or in the fuselage, because blisk blades cannot easily be disassembled.

SUMMARY OF THE INVENTION

The present invention provides a method and apparatus including a machine tool guide mountable to a hand held machine tool driver, such as a 90 degree angle head air motor, that drives a tool for cutting away damaged portions of the leading and trailing edges of the airfoil and machining and blending the damaged areas of the edges to within acceptable levels or tolerances. The tool guide includes a means to set the depth of the cut, which in one embodiment of the invention is an adjustable means, in order to prevent making too deep a cut in the airfoil edge.

The preferred method of airfoil edge repair employs different tool guides, in accordance with the present invention, and different rotary tools for cutting and blending the damaged areas of the airfoil.

First access to the airfoils is gained, preferably through a fan case access window on the engine, airfoils are visually inspected for damage, the depth of the damaged area is measured and the damaged airfoil is cleaned, preferably wiped clean using a suitable solvent, such as Methyl Ethyl Keytone, and a lint free cloth. A curved line is drawn around the damaged area wherein the marked off area preferably has a spanwise length eight times the depth of the deepest gouge and is equally spaced from the point of the deepest gouge. A mask is inserted into the access window on the fan case to protect adjoining airfoils from damage while machining and the delineated damaged area is rough machined away by the operator working through the access window, using an adjustable depth tool guide, of the present invention, mounted on a hand held air motor driving a straight edge rotary cutting tool and using smooth motions to prevent gouging and burning of the airfoil.

After the damaged area is rough cut away, one or more concave contoured edge rotary radius cutters of varying radii are set up in the air motor in conjunction with a second non-adjustable tool guide to machine a blend radius on the airfoil edge. Surfaces along the airfoil edges are then polished to form smooth blends using rubberized abrasive grinding wheels having a grinding surface contoured to form an acceptable leading or trailing edge radius. Finally the entire reworked area is cleaned using a shop vacuum and wiped with a suitable solvent such as Methyl Ethyl Keytone. This procedure is repeated for all damaged airfoils.

ADVANTAGES

Among the advantages provided by the apparatus and method of the present invention is a savings of time required to remove the damaged blades or in the case of BLISKs disassemble the engine, remove and fixture the rotor to allow the airfoil to be machined, and reassemble the rotor in the engine.

Another advantage provided by the present invention is that it allows damaged blades to be simply and effectively repaired whereby an operator does not require a great deal of training.

Yet another advantage provided by the present invention is a field level repair of damage to leading and trailing edges of rotor airfoils and particularly to BLISK type fan blades.

BRIEF DESCRIPTION OF THE DRAWINGS

The foregoing aspects and other features of the invention are explained in the following description, taken in connection with the accompanying drawings where:

FIG. 1 is a perspective view of a machine tool guide having an adjustable cutting depth means in accordance with the present invention mounted on a hand held 90 degree angle head air motor inserted into a portion of the fan section of an engine having damaged BLISK airfoil leading and trailing edges.

FIG. 2 is a perspective view of a machine tool guide having a fixed cutting depth means illustrating a blending step of the repair method of the present invention.

FIGS. 2a and 2b are cross sections illustrating the original airfoil edge radius R and the repaired or blended airfoil radius RM respectively of airfoil 12 in FIG. 2.

FIG. 3 is a perspective view of a rubberized abrasive grinding wheel mounted in the hand held air motor illustrated in FIGS. 1 and 2 having a grinding surface contoured to help blend and polish an airfoil edge radius in accordance with a step of the repair method of the present invention.

DETAILED DESCRIPTION OF THE INVENTION

Referring to FIG. 1, a portion of a gas turbine engine fan section 6 having a fan case 8 circumscribing a BLISK type fan rotor 10 having axially disposed circumferential rows of fan blade airfoils integrally formed thereon including damaged airfoils 12. Also shown is a damaged area 14 having gouges 16 located on a leading edge 18 of a damaged airfoil 12 and a similarly damaged trailing edge 19 on another damaged airfoil 12.

One embodiment of the invention illustrated in FIG. 1 is an adjustable cutting depth machine tool guide 30 mountable, by a mounting means such as mounting clamp 32, to a hand held machine tool driver, such as a 90 degree angle head air motor 34 available from ARO. Air motor 34 drives a straight edge rotary cutter 60 for rough cutting or machining away the damaged area of the leading and trailing edges 18 and 19 of airfoil 12. Adjustable tool guide 30 provides a flat platform 36 operable to rest against the side of airfoil 12 to allow machining of the edge. An adjustable stop means generally shown at 37 has two pins 42 mounted on a slidable base 40 operable to be translated by adjusting screw 46 and to be set by set screw 48. A slot 38 through which straight rotary cutter 60 is disposed allows the pins to set the depth of the cut of rotary cutter 60.

A second embodiment of the invention illustrated in FIG. 2 is a fixed machine tool guide 130 shown to hand held 90 degree angle head air motor 34. This tooling has been found to be particularly useful for machining airfoil edge blend radii RM which may, such as for the original edge radius R, vary in length along the spanwise direction of the airfoil edge. Fixed tool guide 130 provides a flat platform 136 operable to rest against the side of airfoil 12 to allow machining of the edge blend radius RM.

FIG. 1 also depicts part of a repair method of the preferred embodiment of the present invention wherein first access to the airfoils is gained through a fan case access window 9 on engine case 8, next airfoils 12 are visually inspected for damage, and the maximum depth D of the damaged area is measured, usually corresponding to the deepest gouge 20. Then the damaged airfoil is cleaned, preferably wiped clean using a suitable solvent such as Methyl Ethyl Keytone and a lint free cloth, and a curved line L is drawn around the damaged area wherein the marked off area to be removed X preferably has a spanwise length eight times the depth D of the deepest gouge 20 and is equally spaced from the point of the deepest gouge 20. Curved line L is preferably marked with a laboratory certified high purity marker and highlighted with masking tape.

A mask (not shown) is inserted into the access window on the fan case to protect adjoining airfoils from damage while machining and the delineated area to be removed X is rough machined away by the operator working through the access window, using an adjustable depth tool guide 30, of the present invention, mounted on a hand held air motor 34 driving straight rotary cutting tool 60, as described previously. The depth of the cut is adjusted by turning adjusting screw 46 and set with set screw 48 according to the condition of area X. Area X is then removed with the machining apparatus previously described using smooth motions to prevent gouging and burning of the airfoil. This produces a repaired leading edge 18R (or alternatively a repaired trailing edge) with a new spanwise contour.

Referring next to FIG. 2, after the damaged area is rough cut away, at least one rotary radius cutter 138 having a concave contour 139 to produce an airfoil edge blend radius RM, which is only slightly different than the original radius R, is set up in air motor 34 in conjunction with a non-adjustable tool guide 130. Blend radius RM may require two or more concave contour rotary radius cutters 138 of narrowing sizes to form the final blend radius in gradual steps. Using this tooling an airfoil edge blend radius RM is machined on the airfoil edge.

Referring to FIG. 3, the surfaces along the airfoil edge having blend radius RM are radiused and polished to form smooth blends using rubberized abrasive grinding wheels 238 having a grinding surface contoured to form an acceptable airfoil edge radius. Finally the entire reworked area is cleaned using a shop vacuum and wiped using a suitable solvent such as Methyl Ethyl Keytone. This procedure is repeated for all damaged airfoils.

Note that the airfoil edge repair process of the present invention is essentially the same for leading and trailing edges.

While the preferred embodiment of our invention has been described fully in order to explain its principles, it is understood that various modifications or alterations may be made to the preferred embodiment without departing from the scope of the invention as set forth in the appended claims.

We claim:

1. An airfoil spanwise edge repair method comprising:
   delineating a curved area of the edge to be removed that includes a damage area,
   cutting away the curved, delineated area to be removed creating a portion of concavely curved, repaired airfoil edge,
   forming a repaired airfoil edge radius along the concavely curved, repaired airfoil edge portion.

2. An airfoil spanwise edge repair method as claimed in claim 1 wherein said damaged area of said delineated area to be removed includes at least one gouge, the delineated area having a spanwise length equal to eight times the depth D of the deepest gouge in said damaged area and end points of a curved line delineating the area to be removed are located a spanwise distance of 4 D from the point of the deepest gouge.

3. An airfoil spanwise edge repair method as claimed in claim 2 wherein said delineated area is removed by a straight edge rotary cutter driven by a hand held motor and the repaired airfoil edge radius along the repaired airfoil edge is formed using at least one concave contour rotary cutter and finished using a rubberized abrasive grinding wheel having a grinding surface contoured to form a repaired airfoil edge blend radius.

4. An airfoil spanwise edge repair method for repair of airfoils installed on a turbine engine, comprising:
   gaining access to the airfoils through an engine case access window,
   visually inspecting the airfoils for damage,
   locating damage and measuring a maximum depth D of gouges in a damaged area,
   delineating the area of the airfoil to be removed, including the damaged area, with a curved line L wherein each of the end points of line L is located a spanwise distance of 4 D from the point of the deepest gouge,
   removing the delineated area including the damaged area using a straight edge rotary cutter driven by a hand held motor forming a repaired airfoil edge that generally coincides with line L,
   forming an airfoil edge blend radius along the repaired airfoil edge using at least one concave contour rotary cutter, and
   finishing the surface of the repaired leading edge using a rubberized abrasive grinding wheel having a grinding surface contoured to form a repaired airfoil edge blend radius.

* * * * *